(12) United States Patent
Friesen et al.

(10) Patent No.: US 8,939,198 B2
(45) Date of Patent: Jan. 27, 2015

(54) APPARATUS AND METHODS FOR DEPLOYING EQUIPMENT AT A WELLSITE

(75) Inventors: Bruce Friesen, Katy, TX (US); Chris Shallice, Tampa, FL (US)

(73) Assignee: BP Corporation North America Inc., Houston, TX (US)

( * ) Notice: Subject to any disclaimer, the term of this patent is extended or adjusted under 35 U.S.C. 154(b) by 774 days.

(21) Appl. No.: 13/183,274

(22) Filed: Jul. 14, 2011

(65) Prior Publication Data

US 2012/0012310 A1    Jan. 19, 2012

Related U.S. Application Data

(60) Provisional application No. 61/364,531, filed on Jul. 15, 2010.

(51) Int. Cl.
| | | |
|---|---|---|
| *B66F 1/02* | (2006.01) | |
| *E21B 43/34* | (2006.01) | |
| *C10L 3/10* | (2006.01) | |
| *B01D 53/14* | (2006.01) | |

(52) U.S. Cl.
CPC . *E21B 43/34* (2013.01); *C10L 3/10* (2013.01); *B01D 53/1462* (2013.01)

USPC .................................. 166/75.11; 414/334

(58) Field of Classification Search
CPC ............ E21B 19/00; E21B 41/00; B66F 1/02
USPC ............... 166/75.11, 369; 414/434; 254/89 R
See application file for complete search history.

(56) References Cited

U.S. PATENT DOCUMENTS

| 3,180,601 A * | 4/1965 | Belt ............................... 248/151 |
| 5,006,034 A * | 4/1991 | Bragg et al. ................... 414/555 |
| 2007/0221382 A1* | 9/2007 | Schimp .......................... 166/369 |

* cited by examiner

*Primary Examiner* — Brad Harcourt
(74) *Attorney, Agent, or Firm* — Gunnar Heinisch

(57) ABSTRACT

A system for transporting and deploying a natural gas processing system comprises a base. In addition, the system comprises a plurality of natural gas processing units mounted to the base. Further, the system comprises a plurality of jacking units attached to the base and configured to raise and lower the base. Each jacking unit comprises a post, an upper lift member moveably coupled to the post, a lower lift member moveably coupled to the post, and a pair of actuators. Moreover, each actuator has an upper end coupled to the upper lift member and a lower end coupled to the lower lift member.

17 Claims, 12 Drawing Sheets

APPARATUS AND METHODS FOR DEPLOYING EQUIPMENT AT A WELLSITE

CROSS-REFERENCE TO RELATED APPLICATIONS

This application claims benefit of U.S. provisional patent application Ser. No. 61/364,531 filed Jul. 15, 2010, and entitled "Modular Natural Gas Processing Systems for Treatment at the Wellhead," which is hereby incorporated herein by reference in its entirety.

STATEMENT REGARDING FEDERALLY SPONSORED RESEARCH OR DEVELOPMENT

Not applicable.

BACKGROUND

1. Field of the Invention

This invention relates generally to the field of exploration and production of hydrocarbons. More specifically, the invention relates to apparatus and methods for deploying equipment such as natural gas processing systems at the wellsite.

2. Background of the Technology

Unprocessed natural gas in its native form contains varying percentages of the following components: hydrogen sulfide; carbon dioxide; lower aliphatic hydrocarbons such as methane, ethane, propane, butane, pentane, and hexane; small amounts of aliphatic hydrocarbons having more than six carbon atoms; water vapor; nitrogen; and trace amounts of gases such as mercaptans, carbonyl sulfide, helium and argon. In addition, during the drilling and initial flow of natural gas from wells, fluids such as drilling muds, fraccing fluids, carbon dioxide, and methanol may be introduced to improve flow and life of the wells. To be commercially acceptable, produced natural gas in its native form must undergo processing to remove many of the components, other than methane, in order to meet stringent specifications with respect to heating value and the content of certain components prior to introduction to commercial pipelines. For example, a sufficient amount of hydrogen sulfide must be removed from the natural gas so that the processed gas product has a hydrogen sulfide concentration of less than about 0.25 to 0.5 grains per 100 standard cubic feet. Further, the carbon dioxide content of the processed gas product should be less than about two mole percent (4 wt %) since higher concentrations can be corrosive. Removal of carbon dioxide from the produced gas is also preferable since its presence reduces the heating value of the natural gas.

Produced natural gas may be processed at the wellsite (i.e., at the location of the well from which the natural gas was produced) or transported from the wellsite in its native form, along with produced natural gas from other wellsites, to a centralized gas processing facility. Some types of processing systems and methods commonly employed in the controlled environment of a central processing facility are not designed or suitable for use at remote wellsite locations. Accordingly, systems and methods for processing natural gas at the wellsite require consideration of a multitude of factors that are unique to on-site processing. For example, some wellsites are located in remote areas which are not readily accessible and have no on-site operating personnel. As another example, many wellsites are located in geographical areas subject to extreme changes in climatic conditions from a winter period with ice, snow and extremely low temperature conditions (e.g., 32° F. to −50° F.) to a summer period with extremely high temperature conditions (e.g., 90° F. to 120° F.). While environmental conditions may be controlled at a central processing facility, environmental conditions at remote wellsites are generally uncontrollable, and thus, processing and production equipment at the wellsites are subject to extreme conditions without the advantage of constant on-site maintenance and operating service personnel.

Another consideration for on-site processing systems is the need for ease of transportation and deployment. As previously described, due to the remote locations of some wellsites, simply getting the processing equipment to the wellhead in a safe and efficient manner may be challenging. For many on-site applications, the need for the specific processing equipment only lasts for a relatively short period of time as compared to the total production time. Consequently, it is often desirable to periodically relocated processing equipment between different wellsites. Most conventional on-site gas processing systems are loaded and unloaded from a transport vehicle (e.g., tractor trailer) with a crane or are permanently located on trailers. Thus, a crane must be acquired or rented, and transported to the wellsite along with the gas processing equipment. In addition, during the initial stages of preparing for production, fracturing operations, and initial flow back, wellsites are typically congested with drilling and fracturing equipment. Consequently, there may be limited space for locating and operating a crane to load and unload the gas processing equipment at the wellsite. Moreover, locating wheeled transportation within a congested site may lead to additional issues as well as safety issues related to accessing and leaving raised trailer mounted equipment.

Accordingly, there remains a need in the art for apparatus and systems for deploying equipment such as gas processing systems at remote wellsites which offer the potential to reduce and/or eliminate the issues described above. Such systems and methods would be particularly well-received if they did not require additional equipment and associated costs to deploy the equipment at the wellsite.

BRIEF SUMMARY OF THE DISCLOSURE

These and other needs in the art are addressed in one embodiment by a system for transporting and deploying a natural gas processing system. In an embodiment, the system comprises a base. In addition, the system comprises a plurality of natural gas processing units mounted to the base. Further, the system comprises a plurality of jacking units attached to the base and configured to raise and lower the base. Each jacking unit comprises a post, an upper lift member moveably coupled to the post, a lower lift member moveably coupled to the post, and a pair of actuators. Moreover, each actuator has an upper end coupled to the upper lift member and a lower end coupled to the lower lift member.

These and other needs in the art are addressed in another embodiment by a method for transporting and delivering equipment to a deployment location. In an embodiment, the method comprises (a) mounting the equipment on a base. In addition, the method comprises (b) positioning the base on a transport vehicle. Further, the method comprises (c) transporting the base and the equipment to the deployment location with the transport vehicle. Still further, the method comprises (d) coupling a plurality of jacking units to the base. Moreover, the method comprises a (e) incrementally lifting the base to a first height relative to the ground with the jacking units at the deployment location. The method also comprises (f) moving the transport vehicle from beneath the base while the base is disposed at the first height.

These and other needs in the art are addressed in another embodiment by a method for processing produced natural gas at a wellsite. In an embodiment, the method comprises (a) mounting a gas processing system to a base. In addition, the method comprises (b) positioning the base and the gas processing system mounted thereto on a first transport vehicle. Further, the method comprises (c) transporting the base and the gas processing system to the wellsite with the first transport vehicle. Still further, the method comprises (d) coupling a plurality of jacking units to the base. Each jacking unit comprises a vertical post, an upper lift member slidably coupled to the post, a lower lift member slidably coupled to the post and attached to the base, and a pair of actuators coupled to the upper and lower lift members. Moreover, the method comprises (e) extending each vertical post downward into engagement with the ground or support disposed on the ground. The method also comprises (f) moving each lower lift member upward along its corresponding post after (e) to lift the base and the gas processing system mounted thereto from the first transport vehicle.

Embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
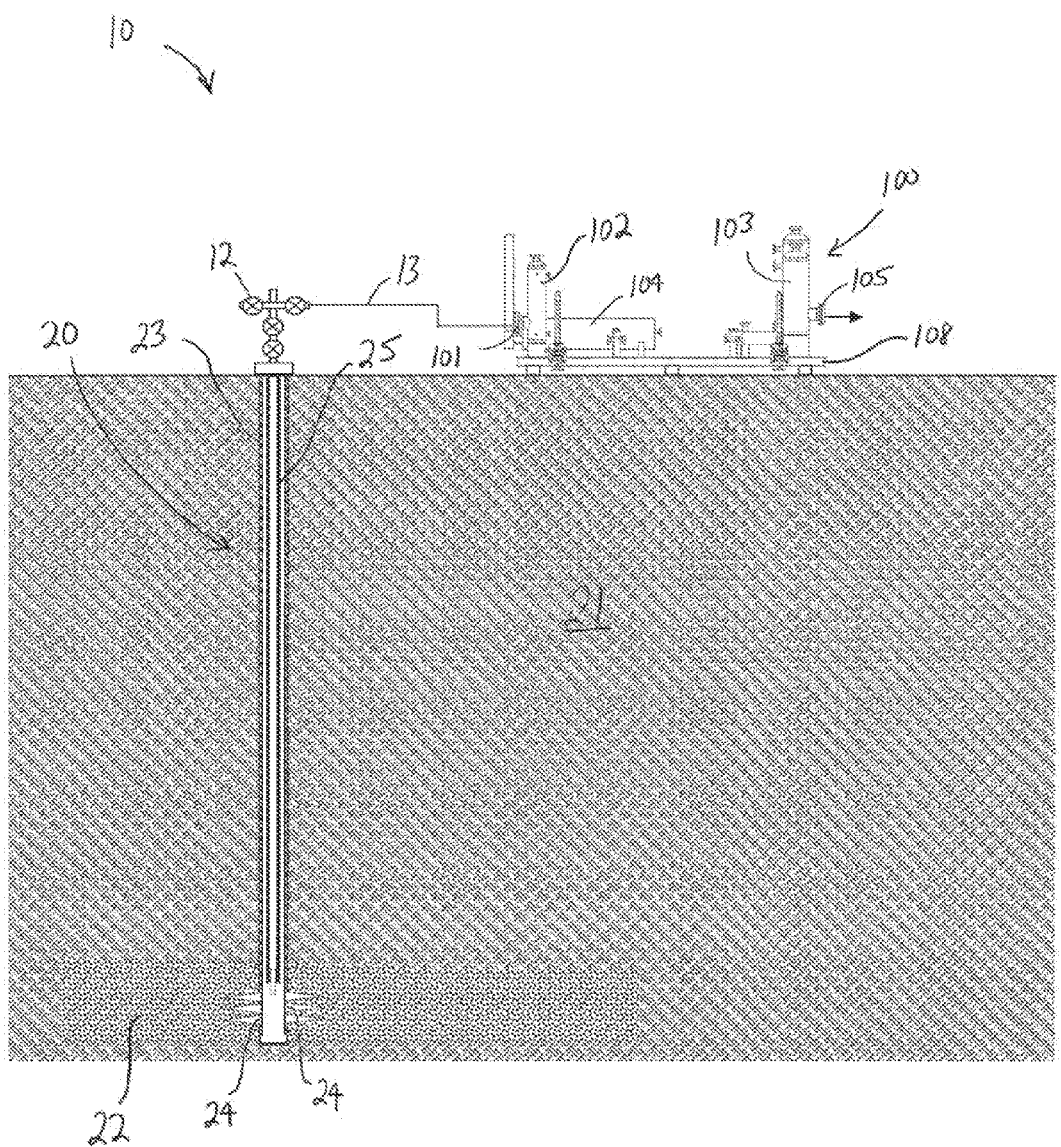
FIG. 1 is a schematic view of a gas processing system and deployment apparatus in accordance with the principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring now to FIG. 1, an embodiment of a system 100 for processing produced natural gas at a wellsite 10 is shown. System 100 is mounted on a deployment apparatus 108 positioned on the surface 11 and is coupled to a wellhead 12 with a gas conduit or flow line 13. As will be described in more detail below, deployment apparatus 108 facilitates the loading and unloading of system 100 from a transport vehicle such as a flat bed truck, a tractor trailer, a rail car, or the like at wellsite 10.

Wellhead 12 is disposed at the upper end of a hydrocarbon producing wellbore 20 that traverses an earthen formation 21 comprising a production zone 22. Casing 23 extends from wellhead 12 into subterranean wellbore 20, and includes perforations 24 that allow raw, unprocessed natural gas, as well as other fluids such as water, liquid hydrocarbons, etc., to pass from production zone 22 into wellbore 20. Within wellbore 20, the fluids including the unprocessed natural gas are produced through production tubing 25 to wellhead 12. Tubing 25 extends from wellhead 12 through casing 23 into wellbore 20. If the pressure and volumetric flow rate of the formation fluids are insufficient to lift the fluids to the surface 11, a pump may be employed to facilitate production to wellhead 12. Thus, the formation fluids including natural gas flow from pay zone 22 into wellbore 20, then through production tubing 25 to wellhead 12. From wellhead 12 the produced formation fluids flow through conduit 13 to system 100 for processing.

Figure 2:
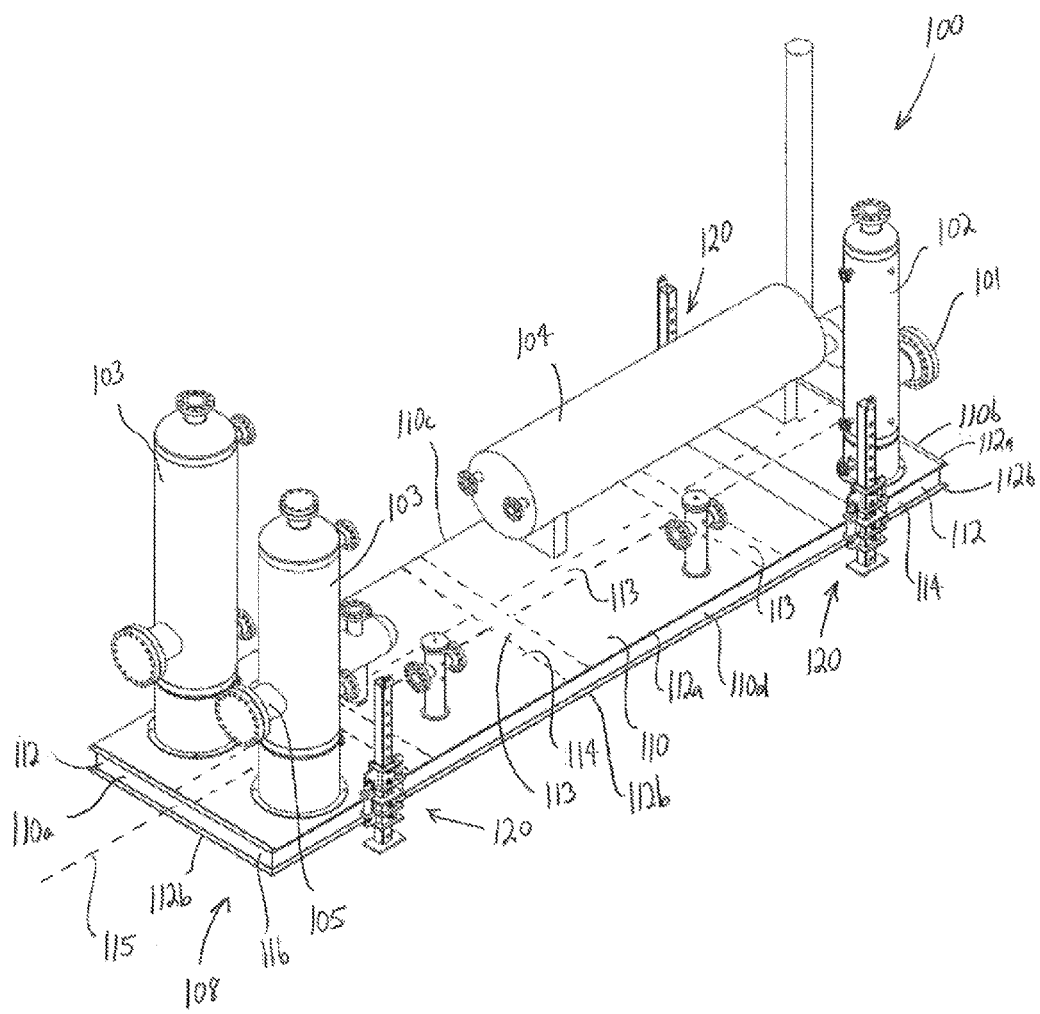
FIG. 2 is a perspective view of the gas processing system and deployment apparatus of FIG. 1.

Referring now to FIGS. 1 and 2, gas processing system 100 is generally configured to "cleanse" the raw natural gas produced at wellhead 12 by removing and separating out undesirable components such as hydrogen sulfide, carbon dioxide, water (liquid and/or vapor), and nitrogen. In this embodiment, gas processing system 100 includes a raw or "dirty" gas inlet 101, a separator 102, filters (e.g. carbon filters, particulate filters, etc) 103, heaters 104, and a processed gas outlet 105. Inlet 101, separator 102, filters 103, heaters 104, and outlet 105 are in fluid communication via fluid conduits not shown in FIGS. 1 and 2 for purposes of clarity. In other embodiments, the on-site gas processing system (e.g., system 100) may comprise other suitable components and/or hardware for processing produced natural gas at a wellsite (e.g., wellsite 10).

Referring now to FIG. 2, deployment apparatus 108 includes a base 110 and a plurality of jacking units 120 removably coupled to base 110. In this embodiment, base 110 is a rectangular skid or pallet having a longitudinal axis 115, a first end 110a, a second end 110b longitudinally opposite end 110a, and lateral sides 110c, d extending between ends 110a, b. In addition, base 110 comprises a plurality of support beams 112 defining the perimeter of base 110, a plurality of support cross-members 113 extending perpendicularly between beams 112, and an upper plate 114 mounted to beams 112 and cross-members 113. Although base 110 is rectangular in this embodiment, in other embodiments, the base of the lifting apparatus (e.g., base 110 of deployment apparatus 108) may have other shapes such as trapezoidal, square, etc. Further, although base 110 includes upper plate 114, which defines a planar upper surface, in other embodiments, the base (e.g., base 110) may be a skid or pallet formed by a plurality of beams and support members (e.g., stringers extending between adjacent beams) without an upper plate disposed thereon.

Figure 3:
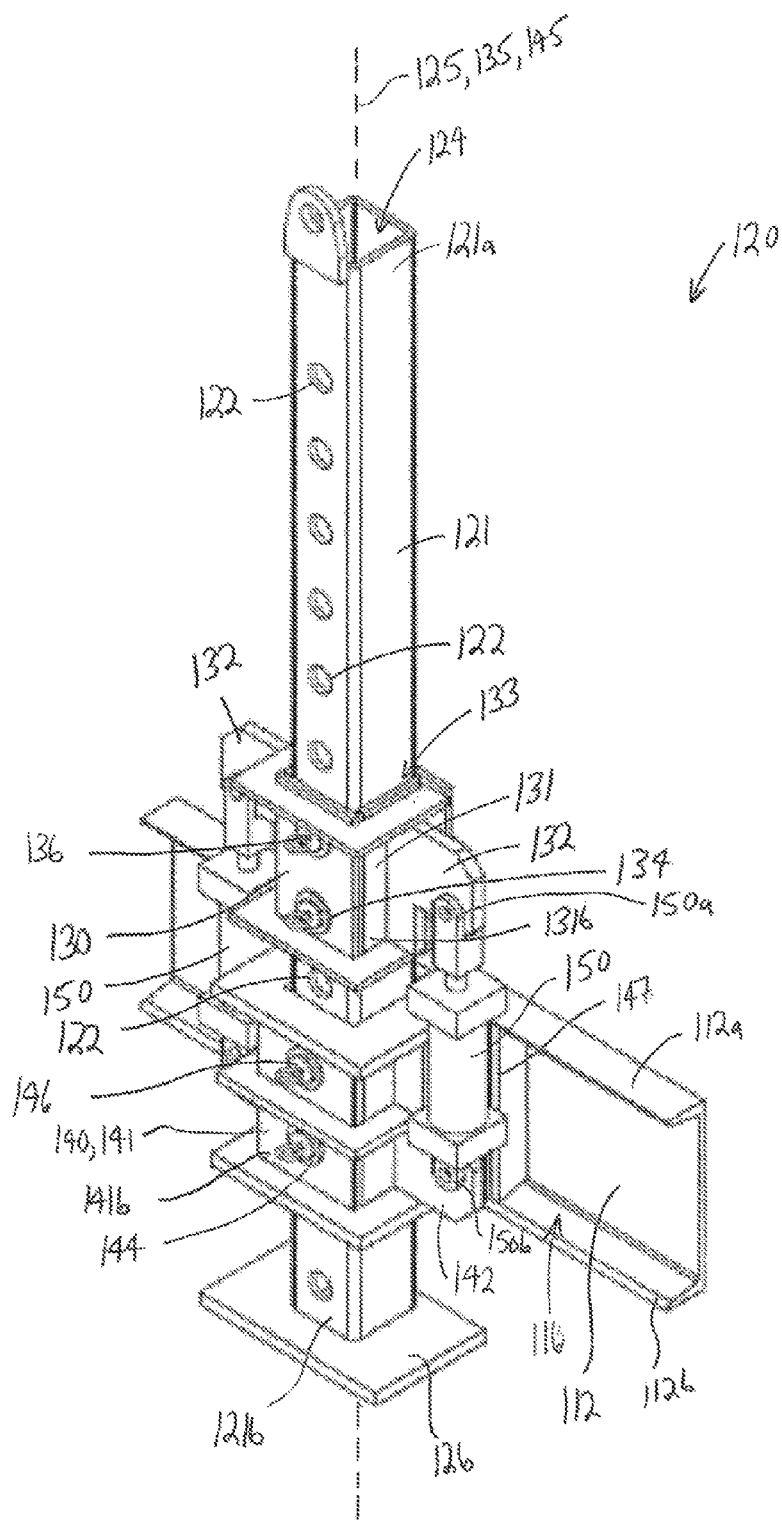
FIG. 3 is a perspective view of one jacking unit of FIG. 2.

Beams 112 extends along the outer perimeter of base 110 and defines ends 110a, b and sides 110c, d of base 110. As best shown in FIGS. 2 and 3, in this embodiment, each beam 112 is an I-beam having an I-shaped cross-section including a first or upper lip 112a extending outward from the top of beam 112 along the perimeter of base 110, and a second or lower lip 112b extending outward from the bottom of beam 112 along the perimeter of base 110. Together, upper and lower lips 112a, b define a recess 116 extending about the perimeter of base 110 along ends 110a, b and sides 110c, d.

Referring still to FIG. 2, jacking units 120 are disposed about the perimeter of base 110 and are removably coupled to base 110 via support beams 112. Jacking units 120 are preferably positioned and distributed about base 110 to enable base 110, and hence system 100 mounted thereto, to be raised and lowered in a stable and controlled fashion. Thus, in this embodiment, four jacking units 120 are provided, two jacking units 120 are disposed along each side 110c, d, and further on each side 110c, d, one jacking unit 120 is positioned proximal end 110a and the other jacking unit 120 is positioned proximal end 110b. As will be described in more detail below, jacking units 120 facilitate the vertical upward and downward movement of base 110 during deployment of system 100.

Figure 4:
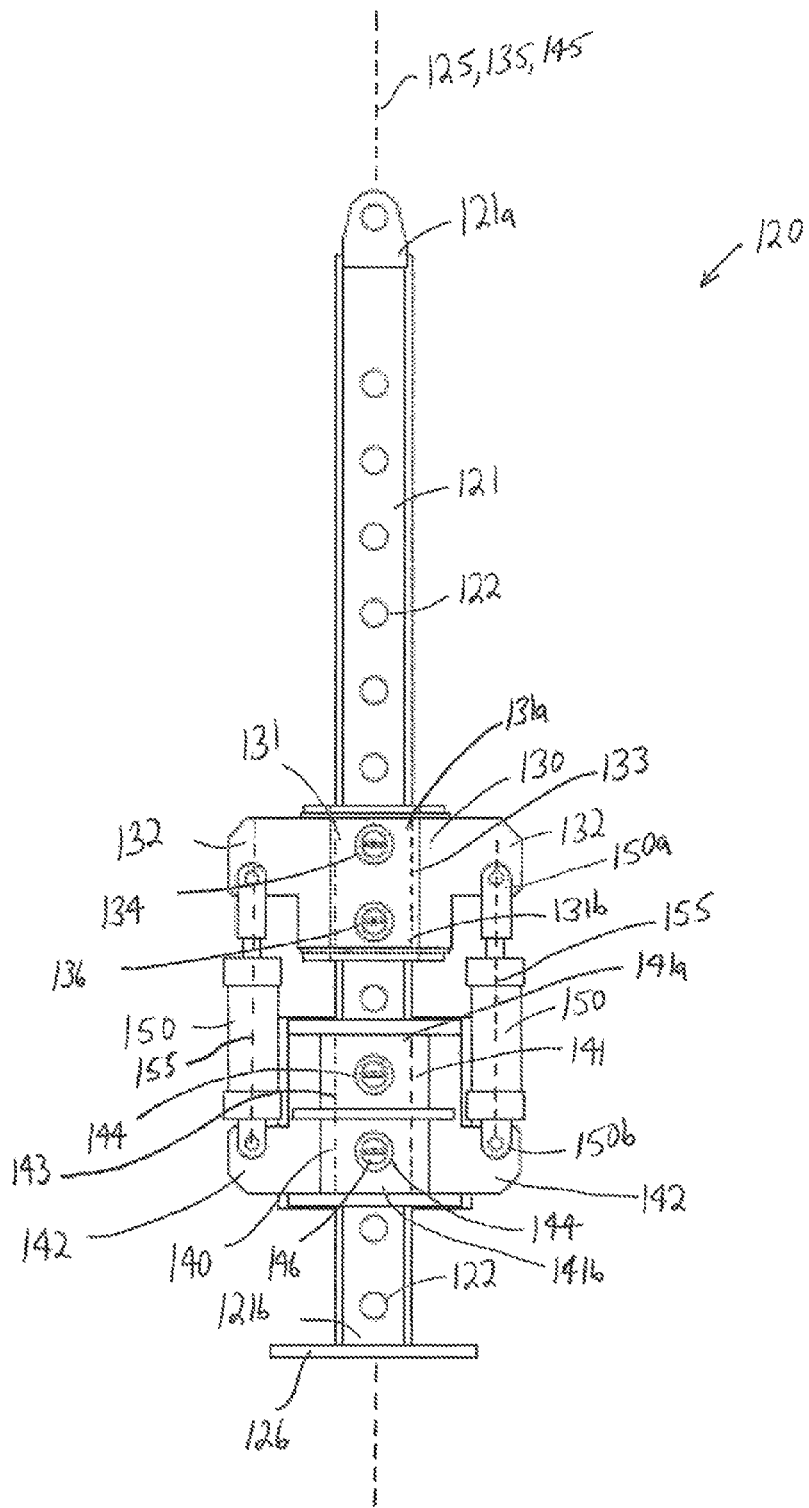
FIG. 4 is a front view of the jacking unit of FIG. 3.

Referring now to FIGS. 3 and 4, one exemplary jacking unit 120 will now be shown and described with the understanding that each jacking unit 120 is the same. In this embodiment, jacking unit 120 includes a vertical support member or post 121, an upper jack collar or lift member 130 moveably coupled to post 121, a lower jack collar or lift member 140 moveably coupled to post 121 below member 130, and a pair of actuators 150, each actuator 150 extending between members 130, 140. Vertical post 121 has a central or longitudinal axis 125, a first or upper end 121a, and a second or lower end 121b opposite end 121a. In this embodiment, post 121 is a tubular, and thus, a central passage 124 extends axially through post 121 from end 121a to end 121b.

Vertical post 121 also includes a plurality of through bores or holes 122. A first or front set of vertically aligned and axially spaced holes 122 extend through the outward or front face of post 121 (i.e., the portion of post 121 facing away from base 110) to passage 124, and a second or rear set of vertically aligned and axially spaced holes 122 extend through the rearward or back face of post 121 (i.e., the portion of post 121 facing base 110) to passage 124. Holes 134 are oriented such that a projection of the central axis of each hole 122 is oriented perpendicular to and intersects axis 125, and such that each hole 122 of the front of post 121 is coaxially and horizontally aligned with one of the holes 134 on the back of post 121.

A foot 126 is attached to lower end 121b of post 121. Foot 126 is a rigid plate that provides a sufficient bearing surface area to support post 121 against the ground or other support member disposed on the ground (e.g., wooden rail tie).

Although post 121 is shown as having a rectangular cross-section taken perpendicular to axis 125, in general, the vertical post (e.g., post 121) may have other cross-sectional geometries including, without limitation, circular, triangular, square, etc. Further, in other embodiments, the vertical post may be a solid rod or shaft (i.e., not tubular).

Figure 5:
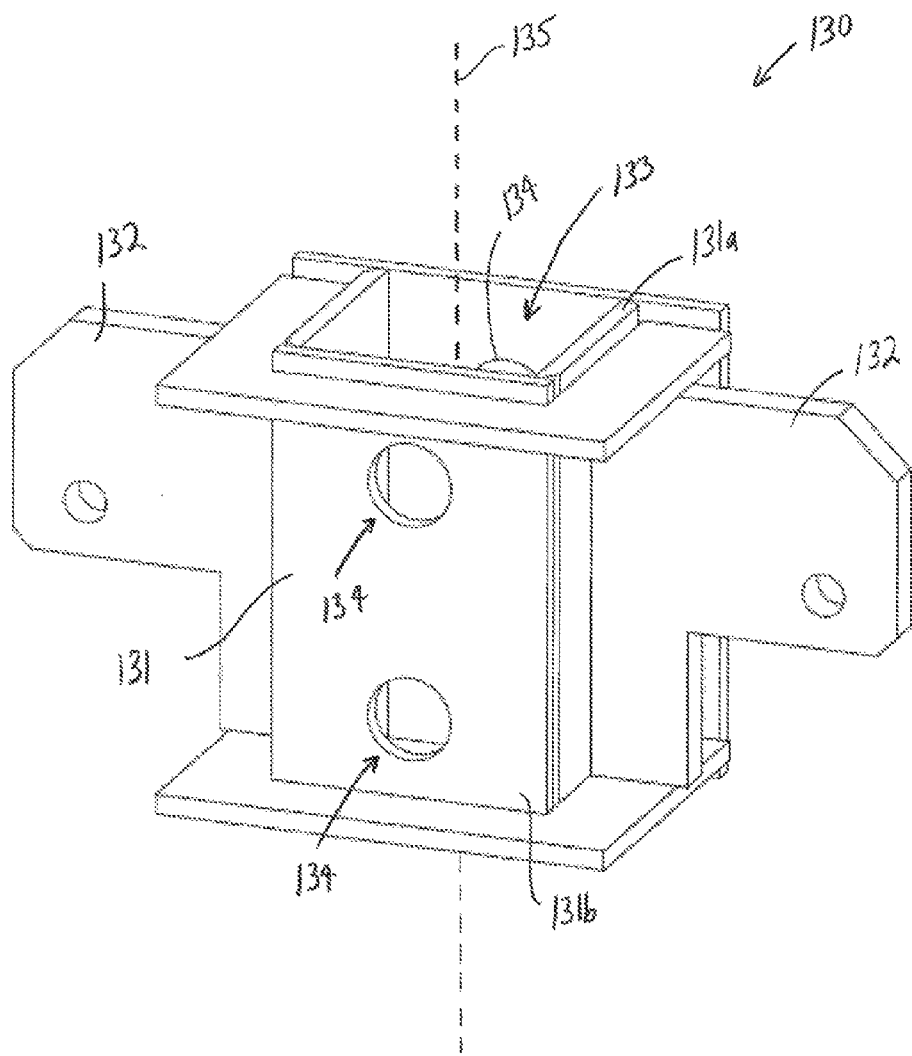
FIG. 5 is a perspective view of the upper lift member of FIG. 3.

Referring now to FIGS. 3-5, upper lift member 130 comprises a sleeve 131 disposed about and slidingly engaging post 121 and a pair of arms 132 extending from sleeve 131. Sleeve 131 has a central or longitudinal axis 135 coaxially aligned with axis 125 of post 121, an upper end 131a, and a lower end 132b opposite end 131a. In addition, sleeve 131 includes a through passage 133 extending axially between ends 131a, b. Post 121 extends axially through passage 133, which is sized to allow vertical movement of post 121 therethrough. In this embodiment, passage 133 is sized and configured to loosely mate with the outer surface of post 121— since post 121 has a rectangular cross-section in this embodiment, passage 133 has a rectangular, prismatic shaped sized and configured to receive post 121.

Sleeve 131 also includes a plurality of through bores or holes 134. A first or front set of vertically aligned and axially spaced holes 134 extend through the outward or front face of sleeve 131 (i.e., the portion of sleeve 131 facing away from base 110) to passage 133, and a second or rear set of vertically aligned and axially spaced holes 134 extend through the rearward or back face of sleeve 131 (i.e., the portion of sleeve 131 facing base 110) to passage 133. Holes 134 are oriented such that a projection of the central axis of each hole 134 is oriented perpendicular to and intersects axis 135, and such that each hole 134 of the front set of holes is coaxially and horizontally aligned with one of the holes 134 on the back of sleeve 131. In addition, holes 134 are sized and axially spaced the same as holes 122 in post 121. Thus, as upper lift member 130 slides axially up and down post 121, holes 134 are repeatedly brought into and out of alignment with different holes 122 in post 121. The axial position of upper lift member 130 relative to post 121 may be fixed (i.e., sleeve 131 may be prevented from moving axially relative to post 121) by aligning holes 134 in sleeve 131 with holes 122 in post 121, and then inserting one pin 136 through each set of aligned holes 134, 122. Each pin 136 is preferably inserted through one hole 134, 122 on the front face of member 130, post 121 and one hole 134, 122 on the back face of member 130, post 121. In other words, each pin 136 preferably extends completely through upper lift member 130 and post 121. To allow upper lift member 130 to move axially relative to post 121, pins 136 are withdrawn from each set of aligned holes 134, 122.

Arms 132 extend laterally in opposite directions from sleeve 131. As will be described in more detail below, the upper end of each bi-directional linear actuator 150 is coupled to one arm 132. Actuators 150 apply axial forces to arms 132 (i.e., forces parallel to axes 125, 135, 145) to move upper lift member 130 axially up and down relative to lower lift member 140 and post 121.

Figure 6:
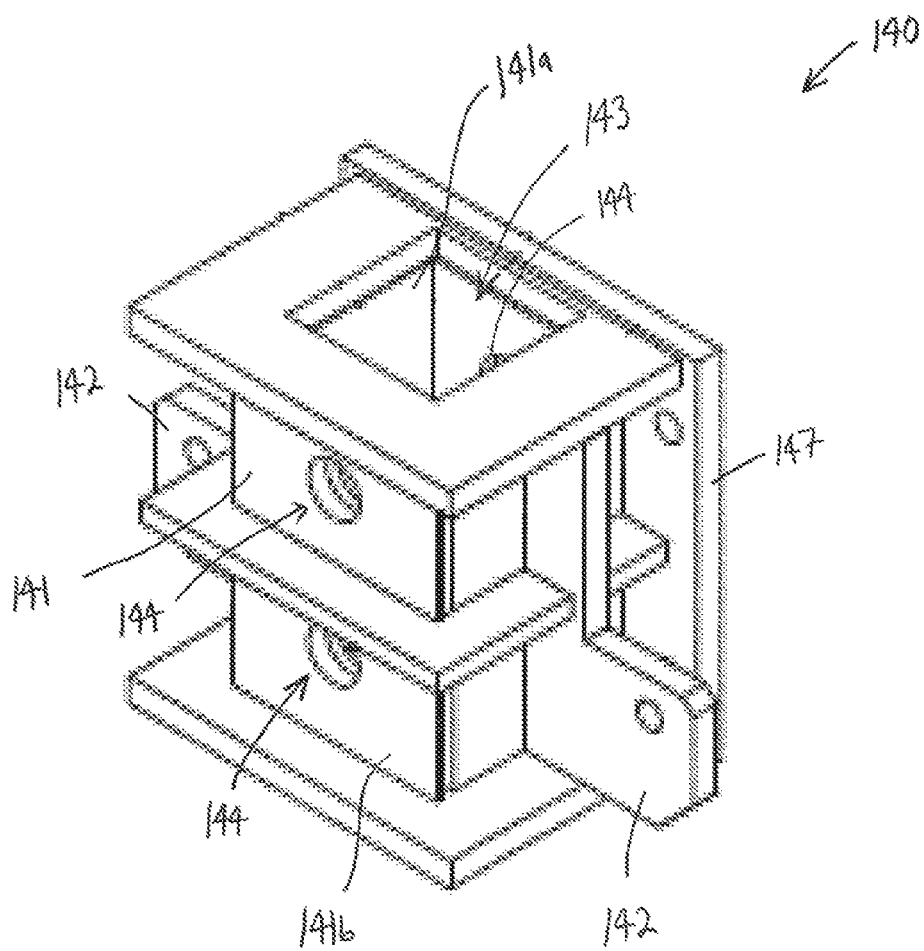
FIG. 6 is a perspective view of the lower lift member of FIG. 3.

Referring now to FIGS. 3, 4, and 6, lower lift member 140 comprises a sleeve 141 slidingly engaging post 121, a pair of arms 142 extending from sleeve 141, and a mounting bracket 147 attached to sleeve 141. Sleeve 141 has a central or longitudinal axis 145 coaxially aligned with axis 125 of post 121, an upper end 141a, and a lower end 141b opposite end 141a. In addition, sleeve 141 includes a through passage 143 extending axially between ends 141a, b. Post 121 extends axially through passage 143. In this embodiment, passage 143 is sized and configured to mate with the outer surface of post 121—since post 121 has a rectangular cross-section in this embodiment, passage 143 has a rectangular, prismatic shaped sized and configured to receive post 121.

Sleeve 141 also includes a plurality of through bores or holes 144. A first or front set of vertically aligned and axially spaced holes 144 extend through the outward or front face of sleeve 141 (i.e., the portion of sleeve 141 facing away from base 110) to passage 143, and a second or rear set of vertically aligned and axially spaced holes 144 extend through the rearward or back face of sleeve 141 (i.e., the portion of sleeve 141 facing base 110) to passage 143. Holes 144 are oriented such that a projection of the central axis of each hole 144 is oriented perpendicular to and intersects axis 145, and such that each hole 144 of the front set of holes is coaxially and horizontally aligned with one of the holes 144 on the back of sleeve 141. In addition, holes 144 are sized and axially spaced the same as holes 122 in post 121. Thus, as lower lift member 140 slides axially up and down post 121, holes 144 are repeatedly brought into and out of alignment with different holes 122 in post 121. The axial position of lower lift member 140 relative to post 121 may be fixed (i.e., sleeve 141 may be prevented from moving axially relative to post 121) by aligning holes 144 in sleeve 141 with holes 122 in post 121, and then inserting one pin 146 through each set of aligned holes 144, 122. Each pin 146 is preferably inserted through one hole 144, 122 on the front face of member 130, post 121 and one hole 144, 122 on the back face of member 140, post 121. In other words, each pin 146 preferably extends completely through lower lift member 140 and post 121. To allow lower lift member 140 to move axially relative to post 121, pins 146 are withdrawn from each set of aligned holes 144, 122.

Arms 142 extend laterally in opposite directions from sleeve 141. As will be described in more detail below, the lower end of each bi-directional linear actuator 150 is coupled to one arm 142. Actuators 150 apply axial forces to arms 142 (i.e., forces parallel to axes 125, 135, 145) to move lower lift member 140 axially up and down relative to upper lift member 130 and post 121.

Referring now to FIGS. 3 and 6, mounting bracket 147 is a rigid plate fixably attached to inward facing surface of sleeve 141 (i.e., the portion of sleeve 141 facing base 110). Thus, bracket 147 is positioned between sleeve 141 and base 110. Bracket 147 is removably coupled to support beam 112, thereby coupling jack unit 120 to base 110. As best shown in FIG. 3, in this embodiment, bracket 147 is positioned between lips 112a, b and is bolted to support beam 112. Further, bracket 147 has a vertical height substantially the same as or slightly less than the vertical distance between lips 112a, b. Thus, as lower lift member 140 moves axially along post 112, bracket 147 axially abuts upper lip 112a. As a result, the weight of base 110 and equipment mounted thereto (e.g., system 100) is shared between mounting bracket 147 and the bolts coupling bracket 147 to support beam 112.

Referring again to FIGS. 3 and 4, actuators 150 supply the force required to lift base 110 and system 100 mounted thereto. In this embodiment, each jacking unit 120 includes two actuators 150, each actuator 150 having a central or longitudinal axis 155, a first or upper end 150a, and a second or lower end 150b. For each jacking unit 120, the two actuators 150 are positioned on opposite sides of post 121 and oriented such that each axis 155 is parallel to axis 125. In addition, upper end 150a of each actuator 150 is coupled to one arm 132 of upper lift member 130 and lower end 150b is coupled to one arm 142 of lower lift member 140.

In this embodiment, each actuator 150 is a bi-directional, linear actuator meaning that each actuator 150 is configured to provide linear forces in opposite directions. In particular, actuators 150 are oriented to extend and apply axial forces that push members 130, 140 axially away from each other, and to contract and apply axial forces that pull members 130, 140 axially towards each other. In general, each actuator 150 may comprise any suitable actuator including, without limitation, a hydraulic actuator, a pneumatic actuator, etc. Due to the anticipated weight of base 110 and system 100, in this embodiment, each actuator 150 is a bi-directional, linear, hydraulic piston-cylinder actuator.

Referring again to FIGS. 2-4, base 110 is raised and lowered with jacking units 120 by incrementally moving lift members 130, 140 of each jacking unit 120 along their corresponding posts 121. More specifically, with feet 126 firmly located on the ground or other ground supported base, base 110 may be raised by fixing each lower lift member 140 to its corresponding post 121 by inserting one pin 146 through each set of aligned holes 144, 122, and allowing each upper lifting unit 130 to move relative to its corresponding post 121 by removing pins 136 disposed in holes 134, 122. Next, actuators 150 are actuated to extend axially and exert an axially upward force on corresponding upper lift members 130, thereby moving upper lift members 130 axially upward along posts 121. Upper lift members 130 are moved axially upward a desired distance and until holes 134 are aligned with a set of holes 122 in corresponding posts 121, and then pins 136 are inserted through each set of aligned holes 134, 122. With each upper lift member 130 fixed to its corresponding post 121 via engagement of pins 136 and aligned holes 134, 122, each lower lift member 140 is allowed to move relative to its corresponding post 121 by removing pins 146 extending through holes 144, 122. Next, actuators 150 are actuated to retract axially and exert an axially upward force on corresponding lower lift members 140, thereby moving the corresponding lower lift members 140 axially upward along corresponding posts 121. Since lower lift members 140 are secured to base 110 via brackets 146 and support beam 112, base 110 and system 100 mounted thereon are lifted by lower lift members 140. Lower lift members 140 are moved axially upward a desired distance and until holes 144 are aligned with a set of holes 122 in corresponding posts 121, and then pins 146 are inserted through each set of aligned holes 144, 122, thereby fixing the axial position of each lower lift member 140 relative to its corresponding post 121. Actuators 150 maintain the axial positions of lower lift members 140 relative to posts 121 to allow pins 146 to be inserted into aligned holes 144, 122. This process may be repeated as many times as needed in order to raise base 110 to the desired height. Thus, bi-directional linear actuators 150 lift base 110 by pushing upper lift members 130 an incremental distance up vertical posts 121 with the lower lift members 140 fixed to posts 121 with pins 146, and then pulling lower lift members 140 an incremental distance up vertical posts 121 with the upper lift members 130 fixed to posts 121 with pins 146.

To lower base 110, the process described above is performed in reverse order. Namely, to lower base 110, each upper lift member 130 is fixed to its corresponding post 121 by inserting one pin 136 through each set of aligned holes 134, 122, and each lower lifting unit 140 is allowed to move relative to its corresponding post 121 when pushed by actuators 150 by removing pins 146 disposed in holes 144, 122. Next, actuators 150 are actuated to extend axially and exert an axially downward force on corresponding lower lift members 140, thereby pushing lower lift members 140 axially downward along posts 121. Since lower lift members 140 are secured to base 110 via brackets 146 and support beam 112, base 110 and system 100 mounted thereon move downward along with lower lift members 140. Lower lift members 140 are moved axially downward a desired distance and until holes 144 are aligned with a set of holes 122 in corresponding posts 121, and then pins 146 are inserted through each set of aligned holes 144, 122. With each lower lift member 140 fixed to its corresponding post 121 via engagement of pins 146 and aligned holes 144, 122, each upper lift member 130 is allowed to move relative to its corresponding post 121 by removing any pins 136 extending through holes 134, 122. Next, actuators 150 are actuated to retract axially and exert an axially downward force on corresponding upper lift members 130, thereby moving the corresponding upper lift members 130 axially downward along corresponding posts 121. Upper lift members 130 are moved axially downward a desired distance and until holes 134 are aligned with a set of holes 122 in corresponding posts 121, and then pins 136 are inserted through each set of aligned holes 134, 122, thereby fixing the axial position of each upper lift member 130 relative to its corresponding post 121. This process may be repeated as many times as needed in order to lower base 110 to the desired height. For extending deployment of system 100, base 110 is preferably lowered until it is in contact with the ground or support disposed on the ground (e.g., wooden blocks or rail ties). Thus, bi-directional linear actuators 150 lower base 110 downward by pushing lower lift members 140 an incremental distance down vertical posts 121, and then pulling upper lift members 130 an incremental distance down vertical posts 121.

It should be appreciated that use of "incremental" jacking units 120, which raise base 110 and system 100 in a stepwise fashion, enables the use of relatively smaller actuators 150. As used herein, the term "incremental" as used to described a jack or lifting device refers to a device or system configured to operate (i.e., raise and/or lower) in a non-continuous manner, as opposed to continuous jack or lifting device such as a single hydraulic cylinder which accomplishes the entire lift in a single movement from the low position to the final raised position, or from the raised position to the low position in one continuous movement of the cylinder, and without movement of the fixed point of the cylinder.

During lifting and lowering operations, each jacking unit 120 may be operated simultaneously with one or more of the other jacking units 120 or at different times than one or more other jacking units 120. In this embodiment, actuators 150 are configured such that the two actuators 150 on each jacking unit 120 operate together, but independent of the actuators 150 on different jacking units 120. Such independent operation of actuators 150 on different jacking units 120 enables feet 126 of different jacking units 120 to be positioned at different elevations to allow base 110 to be leveled on uneven surfaces.

Referring now to FIGS. 7A-7E, system 100 is shown being deployed at wellsite 10 with deployment apparatus 108 and an exemplary transport vehicle 200. More specifically, in FIG. 7A, deployment apparatus 108 and system 100 disposed thereon are shown being transported to wellsite 10 with transport vehicle 200; in FIG. 7B, deployment apparatus 108 is shown lifting system 100 from transport vehicle 200; in FIG. 7C, transport vehicle 200 is shown being removed from underneath base 110 supporting system 100; and in FIGS. 7D and 7E, system 100 is shown being lowered with deployment apparatus 108 and connected to wellhead 12 with conduit 13.

Figure 7A:
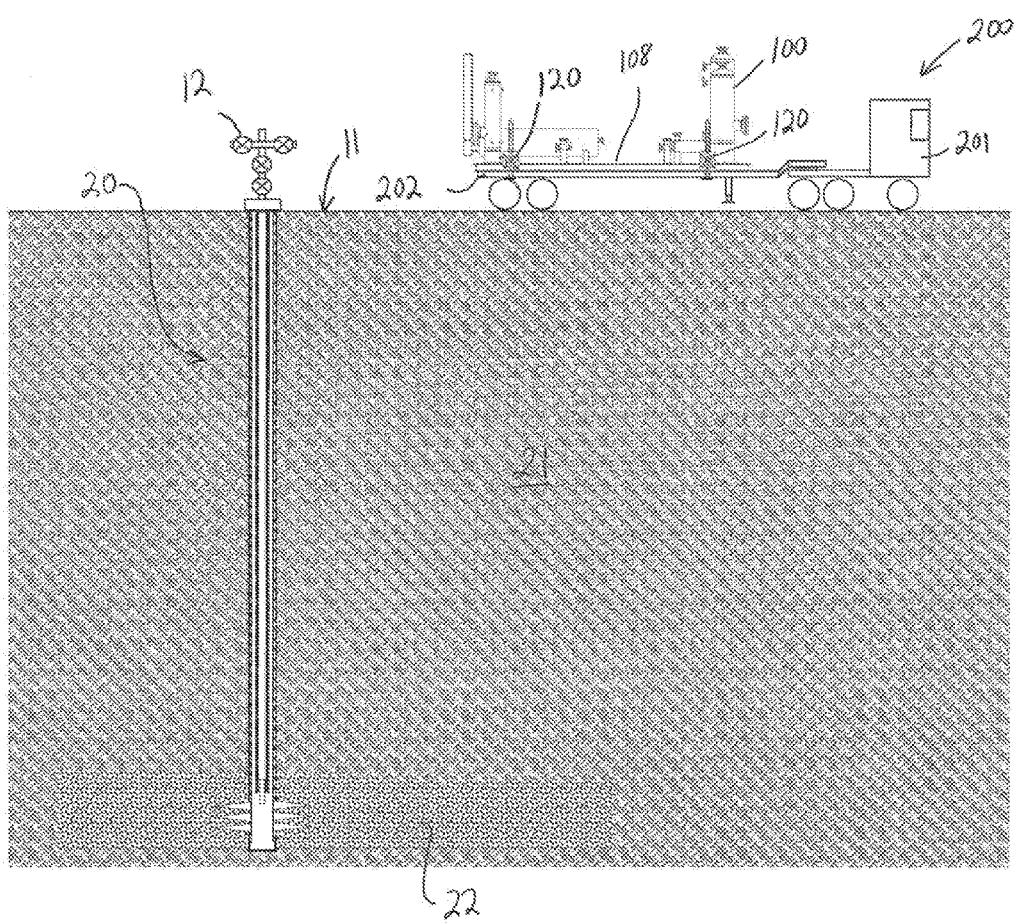
FIGS. 7A to 7E are sequential schematic views of the gas processing system of FIG. 1 being deployed with the deployment apparatus of FIG. 1 and a transport vehicle.

Referring first to FIG. 7A, deployment apparatus 108, with system 100 mounted thereto, is disposed on transport vehicle 200. In this embodiment, transport vehicle 200 is a tractor trailer including a cab 201 that tows and maneuvers a flatbed trailer 202 that directly supports base 110. Base 110 and trailer 202 are sized such that trailer 202 can be positioned between jacking units 120 disposed on opposite lateral sides 110c, d of base 110. Thus, base 110 has a lateral width measured between lateral sides 110c, d that is equal to or greater than the width of trailer 202. In other words, jacking units 120 extend laterally from the perimeter of trailer 202.

In general, base 110 may be transported on trailer 202 with or without jacking units 120 attached to support beam 112. If jacking units 120 are attached to base 110 during transport, feet 126 are preferably raised a sufficient distance from the surface 11 such that they do not interfere with the movement of transport vehicle 200. On the other hand, if jacking units 120 are not attached to base 110 during transport, they may be coupled to support beam 112 at the desired destination with mounting brackets 146 as previously described. Using transport vehicle 200, deployment apparatus 108 and system 100 are positioned at the desired location at wellsite 10.

Figure 7B:
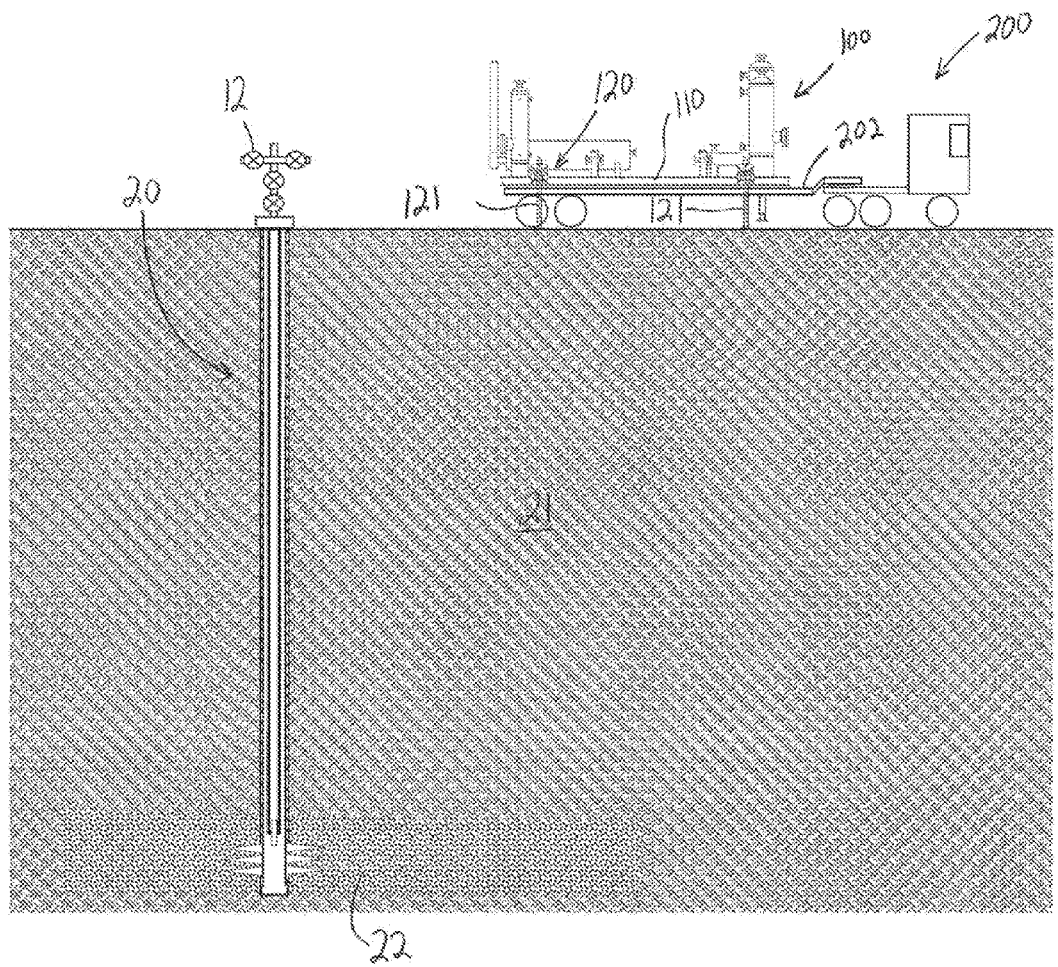
Figure 7C:
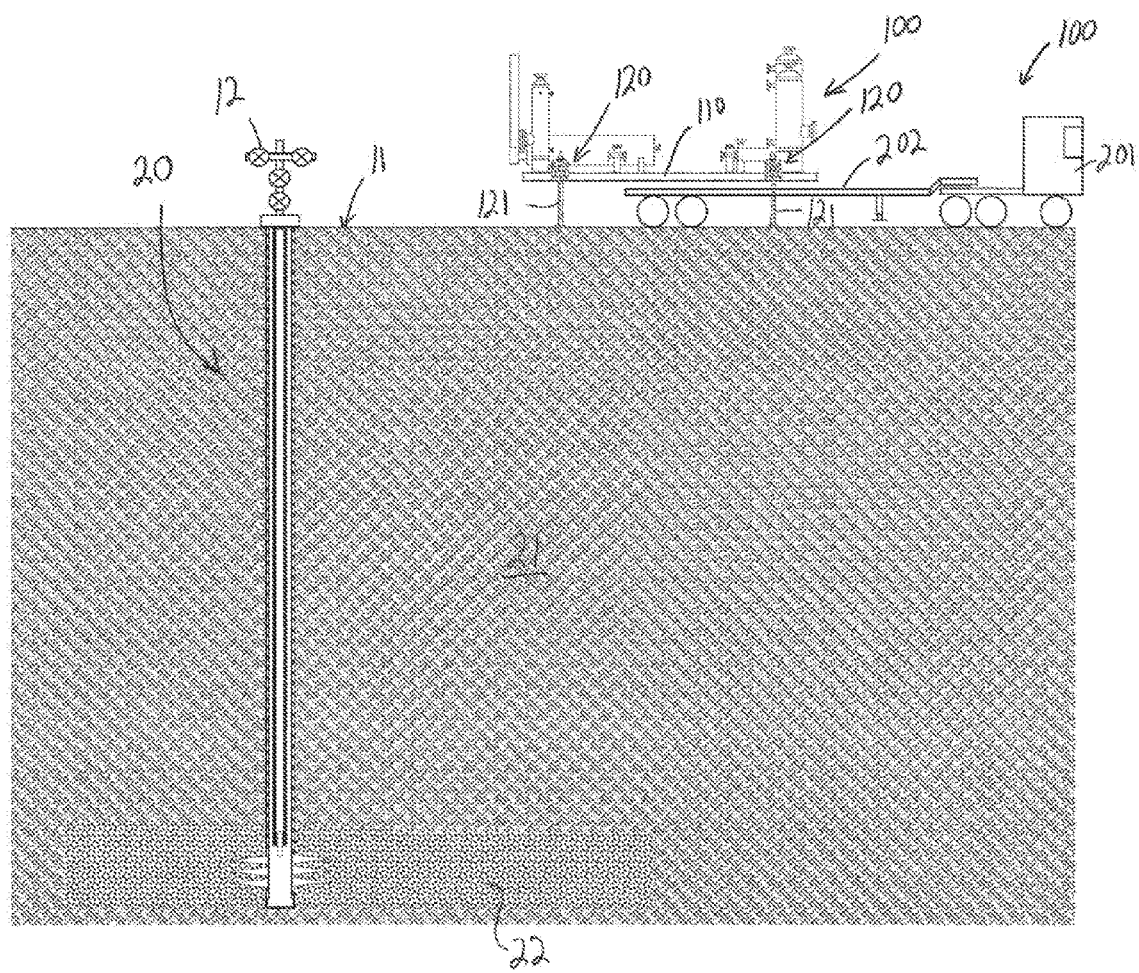

Moving now to FIG. 7B, posts 121 are lowered relative to base 110 and trailer 202 by incrementally moving lift members 130, 140 axially upward along posts 121 as previously described. Posts 121 are lowered until feet 126 engage the surface 11 or a rigid support such as a wooden rail tie disposed on the surface 11. Once feet 126 engage the surface 11 or rigid support, continued incremental movement of members 130, 140 upward along posts 121 raises base 110 and system 100 mounted thereto off of trailer 202. As shown in FIG. 7C, with base 110 spaced above trailer 202, trailer 202 may be pulled from underneath base 110.

Figure 7D:
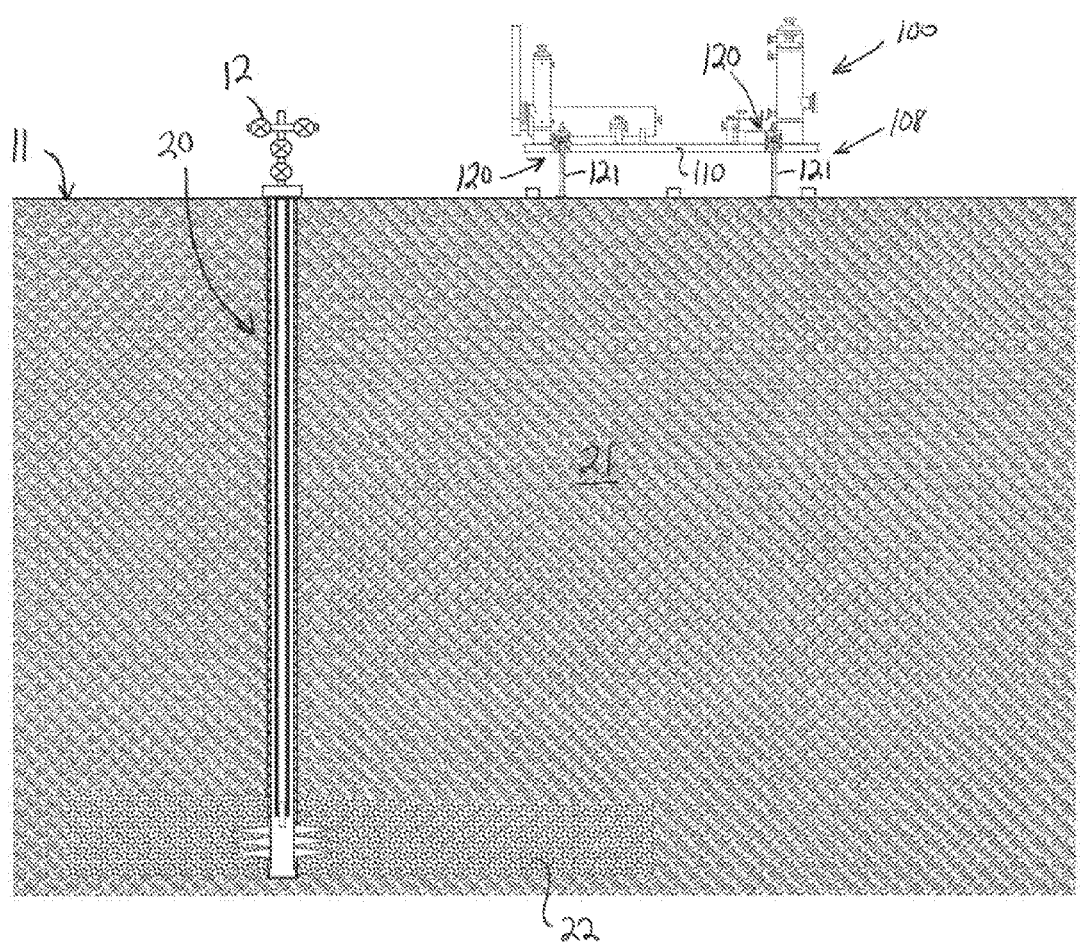
Figure 7E:
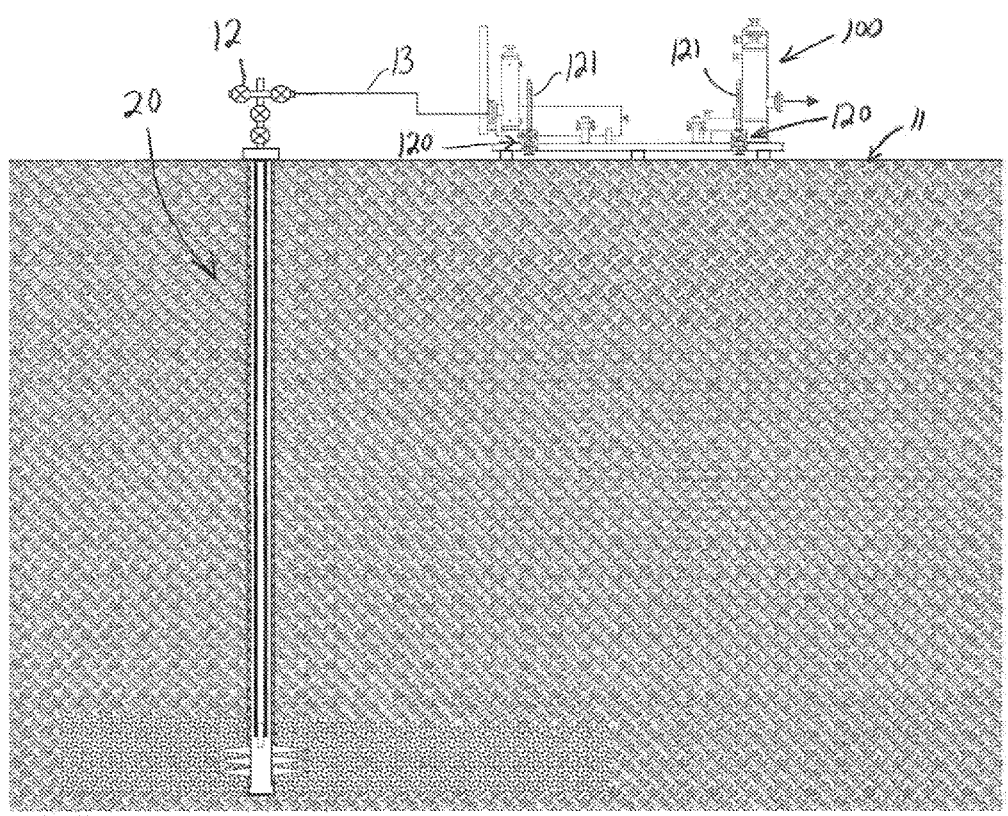

Moving now to FIGS. 7D and 7E, with trailer 202 removed from beneath base 110, base 110 and system 100 mounted thereto are lowered to or proximal the surface 11 to enhance the overall stability of system 100. In particular, lift members 130, 140 are incrementally moved downward along posts 121 as previously described to lower base 110 and system 100. Base 110 is preferably lowered until it is in contact with the ground or supports disposed on the ground. If supports such as wooden blocks or rail ties are employed to support base 110 just above the ground, such supports may be positioned on the ground below base 110 following removal of trailer 202 and before base 110 is lowered to the ground. Next, as shown in FIG. 7E, system 100 is coupled to wellhead 12 with conduit 13 for subsequent gas processing operations.

To load system 100 onto transport vehicle 200 for transport to a different location, system 100 is disconnected from wellhead 12 and conduit 13, base 110 and system 100 are raised upward with jacking units 120, and then trailer 202 is positioned immediately below base 110. Next, base 110 is lowered into engagement with trailer 202 and feet 126 are raised a sufficient distance from the surface 11, thereby allowing transport vehicle 200 to move system 100 to another location.

In this embodiment, pins 136 are manually inserted and removed from aligned holes 134, 122, however, in other embodiments, pins 136 may be automatically inserted and removed from aligned holes 134, 122. For example, each pin 136 may be coupled to a spring loaded mechanism that automatically moves pins 136 into and out of aligned holes 134, 122 during lifting and lowering operations.

In the manner described, jacking units 120 enable base 110 and system 100 to be raised vertically a sufficient height to allow a transport vehicle (e.g., transport vehicle 200) to be maneuvered below base 110. This enables the transport vehicle to be advanced underneath base 110 (e.g., to load base 110 supporting system 100 onto the transport vehicle) or removed from underneath base 110 (e.g., to unload base 110 and system 100 from the transport vehicle). In addition, jacking units 120 allow base 110 to be moved downward relative to posts 121 to load base 110 and system 100 onto the transport vehicle or to lower base 110 and 100 to a stable position for subsequent operations at the wellsite 10. As a result, deployment apparatus 108 eliminates the need for a separate lifting apparatus (e.g., crane, winch lines, etc.), thereby offering the potential to eliminate rental fees associated with lifting apparatus, as well as issues relating to lack of space at the wellsite for such lifting apparatus.

As previously described, gas processing system 100 may be transported and deployed at wellsite 10 with deployment apparatus 108 and transport vehicle 200, without the need for a separate lifting device. Likewise, other equipment and hardware may be transported and deployed at a remote wellsite (e.g., wellsite 10) or any other desired location with embodiments of deployment apparatus (e.g., deployment apparatus 108) and transport vehicles (e.g., transport vehicle 200) described herein. For example, compressors, pumps, "green" completions equipment," carbon dioxide fracturing systems, initial flowback production equipment, carbon dioxide/hydrogen sulfide removal systems, condensate removal systems, sand removal systems, flare systems, power generation systems, heating systems, dehydration units, amine units, etc. may be transported and deployed at a desired location with deployment apparatus 108 and transport vehicle 200 in the same manner as previously described. Although deployment apparatus 108 and a transport vehicle 200 have been shown and described as deploying equipment in the exploration and production industry, it should be appreciated, that embodiments of deployment apparatus 108 and transport vehicle 200 may be used to deploy nearly any type of hardware or equipment in any industry. Since deployment apparatus 108 enables equipment to be loaded onto transport vehicle 200 as well as unloaded from transport vehicle 200, it is particularly suited for the equipment that is commonly deployed at one location, and then moved or re-deployed to a different location on a periodic basis (e.g., every 1-6 months).

Figure 8:
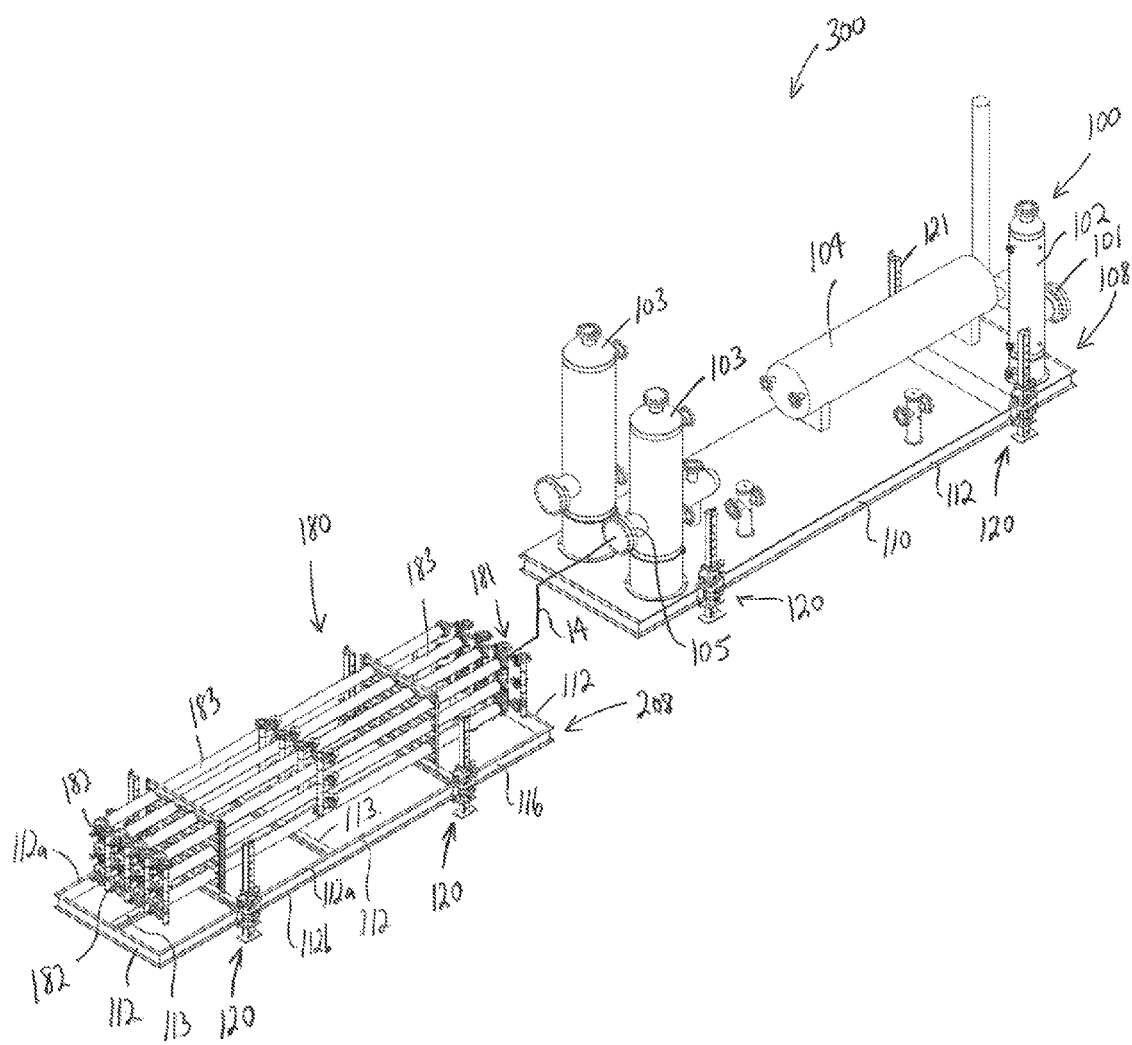
FIG. 8 is an embodiment of a modular gas processing system in accordance with the principles described herein.

Referring now to FIG. 8, an embodiment of a mobile, modular system 300 for processing produced formation fluids including natural gas at wellsite 10 is shown. In this embodiment, system 300 comprises gas processing system 100 mounted to a first deployment apparatus 108 and an embodiment of a gas separating system 180 mounted to a second deployment apparatus 208. System 100 and deployment apparatus 108 are each as previously described. Deployment apparatus 208 is the same as deployment apparatus 108 previously described with the exception that base 210 of apparatus 208 does not include upper plate 114. Deployment apparatus 108, 208 facilitate the independent loading and unloading of systems 100, 180, respectively, from a transport vehicle such as a flat bed truck, a tractor trailer, a rail car, or the like. In this embodiment, gas separation system 180 comprises a gas inlet 181 coupled to outlet 105 with a fluid flow conduit 14, a gas outlet 182, and a plurality of gas separation units 183 in selective fluid communication with inlet 181 and outlet 182. Thus, unprocessed natural gas is supplied to inlet 101 of gas processing system 100 from wellhead 12 with conduit 13 as previously described. The unprocessed gas is processed within system 100 to remove undesirable constituents such as hydrogen sulfide, water (liquid and/or vapor), carbon dioxide, natural gas liquids, solids (e.g., sand), and nitrogen, and then output to gas separation system 180 via conduit 14 extending therebetween. Then the processed gas is passed to system 180 for further processing. In this embodiment, separation units 183 are configured to remove carbon dioxide from processed natural gas output by system 100. However, in other embodiments, the gas separating system (e.g., system 180) may be configured to remove any undesirable gas, liquid, solid, or combination thereof including, without limitation, arsenic, nitrogen, hydrogen sulfide, water (vapor and liquid), solids (e.g., sand), aliphatic hydrocarbons having more than six carbon atoms, and carbon dioxide. Each gas separation unit 181 may comprise any suitable device for removing a contaminate gas from natural gas including, without limitation, a membrane gas separation unit. The processed gas from system 180 is output via outlet 182.

Modular gas processing and separation system 300 may be particularly useful for separating gases such as carbon dioxide and/or nitrogen from produced natural gas at the wellsite 10. For example, system 300 may be used after well fracturing using liquid carbon dioxide. As another example, system 300 may separate the produced natural gas into a first processed gas stream containing a relatively low carbon dioxide concentration and a second gas stream containing a relatively high carbon dioxide concentration. The first gas stream, which may be referred to as a "sales" gas stream, preferably comprises natural gas and carbon dioxide having a concentration acceptable to natural gas purchaser(s), typically be less than 4% w/w and preferably less than 3% w/w. This percentage may be controlled and adjusted depending on the actual sales gas specifications by adjusting of the operating conditions of the modular gas processing and separation system 300. Once the unprocessed natural gas naturally produced by wellhead 12 reaches a carbon dioxide concentration of less than the sales gas specifications, typically about 4%, system 300 can be demobilized and moved to another location. Although system 300 has been described as removing gases such as carbon dioxide from produced, unprocessed natural gas, liquids and solids may also be separated and removed from the produced natural gas with system 300.

Each system 100, 180 may be transported to wellsite 10 via a transport vehicle (e.g., vehicle 200), and then lifted from its respective vehicle with deployment apparatus 108, 208, respectively. Each transport vehicle may then be removed from beneath its respective system 100, 180, and jacking units 120 used to lower systems 100, 180. With systems 100, 180 in position at or proximal the surface 11, system 100 is connected to wellhead 12 with conduit 13, and system 180 is connected to system 100 with conduit 14.

In general, the components of system 100, deployment apparatus 108, separation system 180, and deployment apparatus 208 may be fabricated from any suitable material such as metals and metal alloys (e.g., aluminum, steel, etc.), non-metals (e.g., elastomers, ceramics, etc.), or composites (e.g., carbon fiber and epoxy composite, etc.). However, the components of systems 100, 180 and apparatus 108, 208 are preferably fabricated from durable materials that are corrosion resistant and capable of withstanding harsh outdoor conditions. Examples of suitable materials include, without limitation, polymers, metals, alloys, composites, copolymers, steel, or combinations thereof.

In the manner described, embodiments described utilize deployment apparatus to allow for easier transport of equipment such as gas processing systems to and from remote wellsites without the need for separate lifting devices such as cranes or winch lines to load and unload the equipment. As a result, embodiments described herein offer the potential to reduce equipment transport costs and complexities. In addition, the deployment apparatus include jacking units that may be independently adjusted to ensure the equipment is level when deployed on uneven terrain. The jacking units employ an incremental jacking process leveraging relatively small and lightweight bi-directional linear actuators.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A system for transporting and deploying a natural gas processing system, comprising:
    a base;
    a plurality of natural gas processing units mounted to the base;
    a plurality of jacking units attached to the base and configured to raise and lower the base;
    wherein each jacking unit comprises:
        a vertical post having a longitudinal axis and plurality of vertically aligned, axially spaced holes;
        an upper lift member slidably coupled to the post;
        a lower lift member slidably coupled to the post and fixably attached to the base;
        a pair of actuators, wherein each actuator has an upper end coupled to the upper lift member and a lower end coupled to the lower lift member;
        wherein the upper lift member includes an upper sleeve disposed about the post and a pair of arms extending from opposite lateral sides of the upper sleeve;
        wherein the lower lift member includes a lower sleeve disposed about the post below the upper sleeve and a pair of arms extending from opposite lateral sides of the lower sleeve;
        wherein the upper sleeve and the lower sleeve each include a throughbore;
        a first pin removably disposed in one of the holes of the vertical post and the throughbore in the upper sleeve;
        a second pin removably disposed in one of the holes of the vertical post and the throughbore in the lower sleeve.

2. The system of claim 1, wherein each post has a longitudinal axis and each actuator has a central axis;
    wherein the axes of each actuator are oriented parallel to the axis of the corresponding vertical post.

3. The system of claim 2, wherein each actuator is a bi-directional linear actuator configured to axially extend and axially contract.

4. The system of claim 1 wherein the base comprises a skid or a pallet.

5. The system of claim 4, wherein the plurality of natural gas processing units comprises a gas separation system, a solids separation system, or a liquid separation system.

6. The system of claim 1, wherein each actuator is a hydraulically actuated bi-directional linear actuator.

7. A method for transporting and delivering equipment to a deployment location, comprising:
    (a) mounting the equipment on a base;
    (b) positioning the base on a transport vehicle;
    (c) transporting the base and the equipment to the deployment location with the transport vehicle;
    (d) coupling a plurality of jacking units to the base, wherein each jacking unit comprises:
        a vertical post having a longitudinal axis;
        an upper lift member slidably coupled to the post;
        a lower lift member slidably coupled to the post and attached to the base;
        a pair of actuators, each actuator having an upper end coupled to the upper lift member and a lower end coupled to the lower lift member;
    (e) incrementally lifting the base to a first height relative to the ground with the jacking units at the deployment location; and
    (f) moving the transport vehicle from beneath the base while the base is disposed at the first height;
    (g) lowering the base to a second height relative to the ground with the jacking units after (f), wherein the second height is less than the first height;
    wherein (e) comprises:
        (e1) fixing the position of each lower lift member relative to its corresponding post;
        (e2) actuating the actuators to move each upper lift member axially upward along its corresponding post after (e1);
        (e3) fixing the position of each upper lift member relative to its corresponding post after (e2);
        (e4) actuating the actuators to lift each lower lift member axially upward along its corresponding post after (e3);
        (e5) repeating steps (e1) to (e4) until the base is moved upward a desired distance.

8. The method of claim 7, wherein (b) occurs after (a).

9. The method of claim 7, wherein (d) occurs after (c).

10. The method of claim 7, wherein (g) comprises:
    (g1) fixing the position of each upper lift member relative to its corresponding post;
    (g2) actuating the actuators to push each lower lift member axially downward along its corresponding post after (g1);
    (g3) fixing the position of each lower lift member relative to its corresponding post after (g2);
    (g4) actuating the actuators to move each upper lift member axially downward along its corresponding post after (g3);
    (g5) repeating steps (g1) to (g4) until the base is moved upward a desired distance.

11. The method of claim 10, wherein each lower lift member is fixed to its corresponding post during (e1) and (g3) with a pin inserted through a hole in the lower lift member and a hole in the post; and
    wherein each upper lift member is fixed to its corresponding post during (e3) and (g1) with a pin inserted through a hole in the upper lift member and a hole in the post.

12. A method for processing produced natural gas at a wellsite, comprising:
    (a) mounting a gas processing system to a base;
    (b) positioning the base and the gas processing system mounted thereto on a first transport vehicle;
    (c) transporting the base and the gas processing system to the wellsite with the first transport vehicle;
    (d) coupling a plurality of jacking units to the base, wherein each jacking unit comprises a vertical post, an upper lift member slidably disposed about the post, a lower lift member slidably disposed about the post and attached to the base, and a pair of actuators coupled to the upper and lower lift members;
    (e) extending each vertical post downward into engagement with the ground or support disposed on the ground;
    (f) moving each lower lift member upward along its corresponding post after (e) to lift the base and the gas processing system mounted thereto from the first transport vehicle.

13. The method of claim 12, further comprising:
(g) removing the first transport vehicle from beneath the base and the gas processing system after (f).

14. The method of claim 13, further comprising:
(h) moving each lower lift member downward along its corresponding post after (f) to lower the base and the gas processing system toward the ground.

15. The method of claim 14, further comprising:
(i) coupling the gas processing system to a wellhead at the wellsite;
(j) producing natural gas from the wellhead;
(k) flowing the produced natural gas to the gas processing system; and
(l) processing the produced natural gas with the gas processing system.

16. The method of claim 14, wherein (l) comprises removing one or more undesirable constituents from the produced natural gas.

17. The method of claim 14, further comprising:
(i) moving each lower lift member upward along its corresponding post to lift the base and the gas processing system;
(j) positioning a second transport vehicle below the base after (i);
(k) moving each lower lift member downward along its corresponding post to lower the base and the gas processing system onto the second transport vehicle;
(l) transporting the base and the gas processing system from the wellsite with the second transport vehicle.

* * * * *